(12) United States Patent
Groth et al.

(10) Patent No.: US 12,211,147 B2
(45) Date of Patent: Jan. 28, 2025

(54) MESH CORRECTION DEPENDING ON MESH NORMAL DIRECTION

(71) Applicant: KONINKLIJKE PHILIPS N.V., Eindhoven (NL)

(72) Inventors: Alexandra Groth, Hamburg (DE); Frank Michael Weber, Norderstedt (DE); Jochen Peters, Norderstedt (DE); Rolf Jürgen Weese, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 112 days.

(21) Appl. No.: 17/784,957

(22) PCT Filed: Dec. 21, 2020

(86) PCT No.: PCT/EP2020/087355
§ 371 (c)(1),
(2) Date: Jun. 13, 2022

(87) PCT Pub. No.: WO2021/123403
PCT Pub. Date: Jun. 24, 2021

(65) Prior Publication Data
US 2023/0011809 A1   Jan. 12, 2023

(30) Foreign Application Priority Data
Dec. 19, 2019 (EP) .................. 19218123

(51) Int. Cl.
*G06T 17/20* (2006.01)
*G06F 3/14* (2006.01)
(Continued)

(52) U.S. Cl.
CPC ............. *G06T 17/205* (2013.01); *G06F 3/14* (2013.01); *G06T 7/10* (2017.01); *G06T 19/20* (2013.01);
(Continued)

(58) Field of Classification Search
CPC ......... A61B 34/10; A61B 8/0883; A61B 8/12; A61B 2034/107; G06T 7/174; G06T 7/251
(Continued)

(56) References Cited

U.S. PATENT DOCUMENTS 9,530,206 B2 * 12/2016 Liu .................... G06T 19/20
9,721,360 B2 *  8/2017 Liu .................... G06T 19/20
(Continued)

FOREIGN PATENT DOCUMENTS

EP         3441944 A1 *  2/2019 ......... G06F 3/04815
WO    WO2004047030 A2    6/2004

OTHER PUBLICATIONS

PCT International Search Report, International application No. PCT/EP2020/087355, Mar. 30, 2021.
(Continued)

*Primary Examiner* — Javid A Amini
(74) *Attorney, Agent, or Firm* — Sherry Austin

(57) ABSTRACT

The invention relates to a system and computer-implemented method for enabling correction of a segmentation of an anatomical structure in 3D image data. The segmentation may be provided by a mesh which is applied to the 3D image data to segment the anatomical structure. The correction may for example involve a user directly or indirectly selecting a mesh part, such as a mesh point, that needs to be corrected. The behaviour of the correction, e.g., in terms of direction, radius/neighbourhood or strength, may then be dependent on the mesh normal direction, and in some embodiments, on a difference between the mesh normal direction and the orientation of the viewing plane.

16 Claims, 6 Drawing Sheets

(51) Int. Cl.
    *G06T 7/10*         (2017.01)
    *G06T 19/20*      (2011.01)
    *G06V 10/74*      (2022.01)

(52) U.S. Cl.
    CPC ........ *G06V 10/761* (2022.01); *G06T 2200/24* (2013.01); *G06T 2207/20101* (2013.01); *G06T 2219/2021* (2013.01)

(58) Field of Classification Search
    USPC .......................................................... 382/128
    See application file for complete search history.

(56) References Cited

U.S. PATENT DOCUMENTS

| | | |
|---|---|---|
| 10,282,917 B2 | 5/2019 | Stehle |
| 2009/0304245 A1* | 12/2009 | Egger .................... G06T 7/187 |
| | | 382/128 |
| 2013/0135305 A1* | 5/2013 | Bystrov ................... G06T 7/10 |
| | | 345/420 |
| 2015/0250934 A1* | 9/2015 | Min .................... A61M 60/427 |
| | | 700/119 |
| 2016/0292847 A1* | 10/2016 | Liu ........................ G06T 7/0012 |
| 2020/0226831 A1* | 7/2020 | Su ........................... G06T 7/251 |
| 2020/0250880 A1* | 8/2020 | Groth .................. G06F 3/04845 |

OTHER PUBLICATIONS

Excabert O. et al., "Segmentation of the Heart and Great Vessels in CT Images Using a Model-Based Adaptation Framework", Medical Image Analysis, vol. 15, Issue 6, Dec. 2011, pp. 863-876.

Anonymous., "Selecting—Blender Manual, blender.org", Web. archive.org, Nov. 22, 2019 (Nov. 22, 2019), XP055692231.

* cited by examiner

MESH CORRECTION DEPENDING ON MESH NORMAL DIRECTION

CROSS-REFERENCE TO PRIOR APPLICATIONS

This application is the U.S. National Phase application under 35 U.S.C. § 371 of International Application No. PCT/EP2020/087355, filed on Dec. 21, 2020, which claims the benefit of European Patent Application Serial No. 19218123.8, filed on Dec. 19, 2019. These applications are hereby incorporated by reference herein.

FIELD OF THE INVENTION

The invention relates to a system and computer-implemented method for enabling correction of a segmentation of an anatomical structure in 3D image data, wherein the segmentation is provided by a mesh which is applied to the 3D image data to segment the anatomical structure. The invention further relates to a computer-readable medium comprising instructions to perform the computer-implemented method.

BACKGROUND OF THE INVENTION

Image segmentation is widely used in the medical field to identify anatomical structures in medical images, e.g., by delineating the boundaries of the anatomical structure, by labelling of the voxels enclosed by the boundaries, etc. Once such segmentation has been performed, it is possible to extract clinical parameters such as ventricular mass and wall thickness in case of a cardiac structure. Such segmentation is frequently also referred to as delineation or annotation, and may identify the external boundary surfaces of an anatomical structure, but also internal surfaces of said anatomical structure.

It is known to perform segmentation using meshes. Such meshes may be applied automatically, manually or semi-automatically to a medical image. The automatic or semi-automatic application may involve the use of an adaptation technique, also termed 'mesh adaptation' or 'mesh fitting'. The adaptation technique may, for example, optimize an energy function based on an external energy term which adapts the mesh to the image data and an internal energy term which maintains a rigidness of the mesh. Various adaptation techniques are known for automatically applying meshes to medical images. An example of an automatic technique is described in "Segmentation of the heart and great vessels in CT images using a model-based adaptation framework" by O. Ecabert et al., Medical Image Analysis, Volume 15, Issue 6, December 2011, pages 863-876, which describes the automatic segmentation of the heart from 3D Computed Tomography (CT) images. An applied mesh may also be displayed together with the medical image to visualize information, such as the shape and location of the anatomical structure. For example, the mesh may be shown as an overlay over the anatomical structure in the medical image.

As indicated earlier, the segmentation result, e.g., the applied mesh, may be used for measurements (e.g., left ventricular volume over the heart cycle), for diagnosis, for treatment planning (e.g., aortic valve implant fitting), for the prediction of diseases (e.g., as input for biophysical models), etc. However, in some cases, the segmentation by a segmentation algorithm may not be fully correct. For example, the mesh may be inaccurately applied to the boundary of the anatomical structure, and may thereby be insufficiently accurate for its purpose, e.g., to serve for measurements, treatment planning, etc.

It may therefore be needed for a user to locally correct the segmentation provided by a segmentation algorithm. For example, a user may correct an applied mesh using a view showing at least part of the image and the applied mesh. The correction itself may involve moving and thereby repositioning a mesh part with respect to the image data. The correction may also be applied to a neighbourhood. For example, it is known to enable a user to define a radius in which the correction is applied. The radius may be selected automatically based on the magnitude of the correction, e.g., a larger neighbourhood for a larger correction and a smaller neighbourhood for a smaller correction.

SUMMARY OF THE INVENTION

Disadvantageously, known mechanisms to define a neighbourhood for mesh correction are insufficiently adaptive to local variations in shape of the anatomical structure.

It may be desirable to obtain a system and computer-implemented method for enabling correction of a segmentation of an anatomical structure in 3D image data, wherein the correction is more adaptive to local variations in shape of the anatomical structure.

In accordance with a first aspect of the invention, a system is provided for enabling correction of a segmentation of an anatomical structure in 3D image data, wherein the segmentation is provided by a mesh which is applied to the 3D image data to segment the anatomical structure, the system comprising:

an input interface for accessing the 3D image data of the anatomical structure and mesh data defining the mesh;

a user interface subsystem comprising:
  a user input interface configured to receive user input data from a user input device operable by a user;
  a display output interface configured to provide display data to a display to visualize output of the system;

a processor subsystem configured to, using the user interface subsystem, establish a graphical user interface which enables the user to correct the segmentation of the anatomical structure by the mesh in the 3D image data, wherein the processor subsystem is configured to, using the user interface subsystem:
  display at least one view showing at least part of the mesh applied to at least part of the 3D image data;
  receive user input data indicative of a user-selected point in the view;
  based on the user-selected point, select a mesh part to be corrected;
  apply a correction to said selected mesh part by moving the selected mesh part with respect to a coordinate system of the 3D image data;
  further apply the correction to neighbouring mesh parts in a neighbourhood of the selected mesh part by moving the neighbouring mesh parts; and
  select the neighbouring mesh parts to be included in the correction based on a similarity between a mesh normal direction of a respective neighbouring mesh part and the mesh normal direction of the selected mesh part.

In accordance with a further aspect of the invention, a computer-implemented method is provided for enabling correction of a segmentation of an anatomical structure in 3D image data, wherein the segmentation is provided by a mesh which is applied to the 3D image data to segment the anatomical structure, the method comprising:

accessing the 3D image data of the anatomical structure;
accessing mesh data defining the mesh;
displaying at least one view showing at least part of the mesh applied to at least part of the 3D image data;
receiving user input data indicative of a user-selected point in the view;
based on the user-selected point, selecting a mesh part to be corrected;
applying a correction to said selected mesh part by moving the selected mesh part with respect to a coordinate system of the 3D image data;
further applying the correction to neighbouring mesh parts in a neighbourhood of the selected mesh part by moving the neighbouring mesh parts; and
selecting the neighbouring mesh parts to be included in the correction based on a similarity between a mesh normal direction of a respective neighbouring mesh part and the mesh normal direction of the selected mesh part.

In accordance with a further aspect of the invention, a computer-readable medium is provided comprising transitory or non-transitory data representing a computer program, the computer program comprising instructions for causing a processor system to perform the computer-implemented method.

The above measures involve enabling a mesh-based segmentation of an anatomical structure to be corrected. For that purpose, the image data of the 3D image may be accessed, which is elsewhere also referred to as 3D image data, as well as mesh data defining a mesh for segmenting an anatomical structure in the 3D image data. The mesh may be applied to the 3D image data in any manner as known per se, for example using the aforementioned automatic technique described by O. Ecabert et al. Such application may be performed by the system and/or computer-implemented method, but also by another entity. In the latter example, mesh data may be accessed which already defines an applied mesh.

The user may be enabled to interactively correct the mesh. For that purpose, a graphical user interface may be provided which may provide a user with a view showing at least part of the mesh which is applied to at least part of the image data. For example, the view may be a 2D view which shows a cross-section or volume projection of the 3D image data and a part of the mesh which corresponds with the shown image data. The user may then initiate a correction of the mesh by indicating a point in the view, for example by clicking using a pointing device. Based on the user-selected point, a mesh part to be corrected may be selected. The mesh part may for example be a mesh point, e.g., a vertex, but may also include a set of vertices and/or edges, faces, polygons, surfaces, etc. of the mesh.

The mesh part may then be corrected by moving the mesh part relative to the underlying 3D image data and thereby moving the selected mesh part with respect to a coordinate system of the 3D image data. As a result, coordinates defining the mesh part may be adjusted. Such correction is known per se and may be manually performed by the user, for example by enabling a user to freely drag and thereby move the mesh part using a pointing device, but also in a semiautomatic way, in that at least some of the parameters of the correction, such as a magnitude and direction, may be (pre)selected automatically.

In accordance with the above measures, the correction may not only be applied to a mesh part which is directly or indirectly selected by the user, but also to mesh parts in a neighbourhood of the selected mesh part. In particular, the neighbouring mesh parts to be included in the correction may be selected based on a similarity between their respective mesh normal directions and the mesh normal direction of the selected mesh part. There, 'mesh normal direction' may refer to a direction of a normal of the mesh at the respective mesh part. For example, if the mesh part is a surface part of the mesh, the mesh normal direction may be defined as the normal direction of the surface part. In another example, if the mesh part is a mesh point, e.g., a vertex, the mesh normal direction may be defined as the mesh normal of a limited surface which may be defined to include the vertex and a limited number of surrounding vertices, or to best fit to these surrounding vertices.

The similarity measure may thus express a similarity to the mesh normal direction of the selected mesh part, which may be considered a reference mesh normal direction. The neighbouring mesh parts may then be selected based on their similarity to the reference mesh normal direction, for example by selecting only those neighbouring mesh parts which are sufficiently similar to the reference mesh normal direction.

The above measures are based on the insight that it may be desirable to adaptively select the neighbourhood to which the correction is to be applied in a manner which takes into account curvatures, corners and other local variations in the shape of the anatomical structure. Namely, if the neighbourhood is simply selected based on a predetermined radius around the selected mesh part, or a radius which varies in accordance with the magnitude of the correction, there is a high likelihood that the neighbourhood includes mesh parts which are oriented in a different direction than the selected mesh part, for example by lying around a corner or along a curvature of the mesh. A user may typically wish to correct a mesh part by moving the mesh part in a certain direction. For ease-of-use, known correction techniques typically move surrounding mesh parts in the same or similar direction. The inventors have considered that only similarly oriented mesh parts should be moved in the same or similar direction. In particular, if the correction is along the mesh normal direction, which is frequently the case in case of a local expansion or local contraction of the mesh, only those parts should be moved along the mesh normal direction of the selected mesh part which themselves have a similar mesh normal direction.

By selecting the neighbouring mesh parts based on their similarity in mesh normal direction, only similarly oriented mesh parts may be selected and the correction may only be applied to similarly oriented mesh parts. Thereby, the correction is made adaptive to the local shape of the anatomical structure, in that it is avoided that mesh parts around a corner or on the other side of a curvature are selected. In particular, the neighbourhood may be made adaptive in that the correction may be applied to larger mesh neighbourhoods in relatively flat areas of the mesh, whereas the correction may be applied to smaller mesh neighbourhoods in areas of the mesh where the mesh greatly varies in local shape. Advantageously, it may not be needed for the user to manually define the neighbourhood. Rather, the neighbourhood may be selected adaptively by the system and method.

Optionally, the processor subsystem is configured to:
determine the similarity in mesh normal directions by determining a difference between the mesh normal direction of a respective neighbouring mesh part and the mesh normal direction of the selected mesh part; and
select the neighbouring mesh part to be included in the correction if the difference in mesh normal directions is below a threshold.

The similarity in mesh normal direction may be expressed in various ways, such as a difference between the mesh normal directions. For example, the difference may be expressed as an angle, and thereby as an angular difference, between a first vector representing the mesh normal direction of the selected mesh part and a second vector representing the mesh normal direction of a respective neighbouring mesh part. This angular difference may be compared to an absolute or relative threshold to determine whether a mesh part has a sufficiently similar mesh normal direction or not. Accordingly, the neighbourhoods may be adaptively defined to only include neighbouring mesh parts which have a sufficiently small angular difference. An absolute threshold may for example define a maximum difference of 20° or 10° or 5°. A relative threshold may for example compare the angular difference to a mean or median angular difference, e.g., of all mesh parts shown in the current viewing plane.

Optionally, the processor subsystem is configured to select the neighbouring mesh parts as a connected neighbourhood. It may be preferred to only apply the correction to a connected neighbourhood of mesh parts, as otherwise the correction may become spatially disjunct. Accordingly, in addition to selecting the neighbouring mesh parts in accordance with their similarity in terms of mesh normal direction, said selection may also be restricted to mesh parts which are spatially connected. This may avoid the neighbourhood becoming spatially separated.

Optionally, the processor subsystem is configured to select a magnitude of the correction of a neighbouring mesh part relative to the magnitude of the correction of the selected mesh part based on the similarity in mesh normal directions between the neighbouring mesh part and the selected mesh part. The similarity in mesh normal direction may not only determine a size of the neighbourhood but, in addition or alternatively, also a magnitude of the correction. This magnitude may be also be referred to as 'correction strength' and may conventionally be selected automatically or manually by the user, for example by the user moving the mesh part and the length of the movement representing the correction strength. The correction strength may be applied to the other mesh parts yet modulated in accordance with the similarity in mesh normal direction. Accordingly, mesh parts having a highly similar mesh surface normal may experience a similar magnitude of correction, whereas mesh parts having a less similar mesh normal direction may experience a smaller magnitude of correction. This may provide a gradual decrease of the correction from a maximum at the selected mesh part to a minimum, such as zero, at a border of the neighbourhood. Thereby, an unnatural stepwise transition between correction and non-correction may be avoided.

Optionally, the processor subsystem is configured to limit the magnitude of the correction to be monotonically declining along a line from the selected mesh part to each neighbouring mesh part. By limiting the magnitude of the correction to be monotonically declining from the selected mesh part outwards, it may be ensured that the neighbourhood to which the correction is applied remains compact.

The following describes various embodiments which may be combined with the aforementioned selection of neighbouring mesh parts but which also may be implemented separately of the described neighbourhood selection mechanism.

Optionally, the view is defined by a viewing plane having an orientation in the coordinate system of the 3D image data, wherein the processor subsystem is configured to select the mesh part based on the user-selected point based on the mesh part satisfying an angular suitability criterion, wherein the angular suitability criterion defines that a difference of the mesh normal direction of a respective mesh part with respect to the viewing plane is below a threshold or is minimal amongst a set of mesh parts in a neighbourhood of the user-selected point. Additionally or alternatively to selecting the neighbourhood to which the correction is to be applied based on the similarity in mesh normal direction, the mesh normal direction may also be used to select a mesh part based on the user-selected point. Namely, instead of selecting a mesh part which is simply nearest to the user-selected point, the selection may be subject to the mesh part having an orientation which is sufficiently orthogonal to the viewing plane. Namely, only if the mesh normal direction of a respective mesh part is sufficiently similar to the orientation of the viewing plane (and thereby the orientation of the respective mesh part is sufficiently orthogonal to the viewing plane), the mesh part may be considered to be suitable for correction in the current view. This aspect of the invention may be based on the insight that a large angle between the mesh normal direction and the viewing plane may lead to an inaccurate correction decision by the user since the view shows an unsuitable cut through the mesh. Accordingly, the user selection of a mesh part to be corrected may be altered based on whether it is considered that the mesh part may be accurately corrected in the current view. This way, the selection may be altered to ensure that only mesh parts are selected which are deemed suitable, or that a selection and subsequent correction of an unsuitable mesh part may be refused. For that purpose, an angular suitability criterion may be evaluated, which may compare the mesh normal direction of the mesh part and the orientation of the viewing plane and which may consider a mesh part to be suitable if their difference is below an absolute or relative threshold or minimal within a neighbourhood of the user-selected point.

Optionally, the processor subsystem is configured to select the mesh part to be corrected as the mesh part which is:
 nearest to the user-selected point, and
 satisfies the angular suitability criterion.
Accordingly, the mesh part may be selected as a nearest mesh parts amongst all mesh parts which satisfy the angular suitability criterion.

Optionally, the processor subsystem is configured to select the mesh part to be corrected as the mesh part which is:
 nearest to the user-selected point in the 3D coordinate system; or
 nearest to the user-selected point in the viewing plane.
The selection of the 'nearest' mesh part may be constrained. For example, in some embodiments, the nearest mesh part may be required to lie in the viewing plane, but in other embodiments may be an overall nearest mesh part in 3D.

Optionally, the correction moves the selected mesh part along a line, and wherein the processor subsystem is configured to determine a direction of the line based on the mesh normal direction of the selected mesh part. For example, the processor subsystem may be configured to determine the direction of the line to be substantially equal to the mesh normal direction of the selected mesh part or to have a difference with the mesh normal direction of the selected mesh part which is below a further threshold. For example, the further threshold may require a difference below 20° or 10° or 5°.

Optionally, the orientation of the viewing plane is preconfigured, and wherein the angular suitability criterion is precalculated for all or a subset of the mesh parts of the mesh before the selection of the user-selected point. Accordingly, the mesh data may comprise a precalculated angular suitability criterion, thereby avoiding a need for the angular suitability to be calculated in real-time. It is noted that instead of the angular suitability being precalculated, also the mesh normal direction and/or the angular difference between the mesh normal direction and the orientation of the viewing plane may be precalculated and stored as part of the mesh data, e.g., as metadata.

Optionally, the processor subsystem is configured to visualize, in the view, said satisfying of the angular suitability criterion by a respective mesh part and/or the difference of the mesh normal direction of the respective mesh part with the viewing plane. For example, the processor subsystem may be configured to visualize the satisfying of the angular suitability criterion and/or the difference of the mesh normal direction of the respective mesh part with the viewing plane by color-coding of respective mesh parts in the view. For example, mesh parts which are deemed unsuitable may be coloured red while mesh parts which are deemed suitable may be coloured green.

It will be appreciated by those skilled in the art that two or more of the above-mentioned embodiments, implementations, and/or optional aspects of the invention may be combined in any way deemed useful.

Modifications and variations of the system, the computer-implemented method and/or the computer program product, which correspond to the described modifications and variations of another one of said entities, can be carried out by a person skilled in the art on the basis of the present description.

BRIEF DESCRIPTION OF THE DRAWINGS

These and other aspects of the invention will be apparent from and elucidated further with reference to the embodiments described by way of example in the following description and with reference to the accompanying drawings, in which.

It should be noted that the figures are purely diagrammatic and not drawn to scale. In the figures, elements which correspond to elements already described may have the same reference numerals.

LIST OF REFERENCE NUMBERS

Figure 2A:
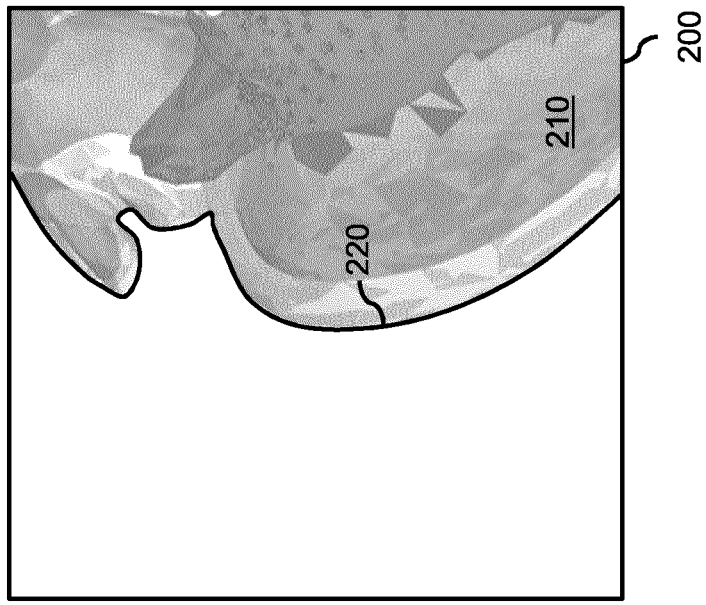
FIG. 2A shows a view of 3D image data containing an anatomical structure, being in this example a cardiac structure, while showing a boundary of the cardiac structure.

The following list of reference numbers is provided for facilitating the interpretation of the drawings and shall not be construed as limiting the claims.

20 data storage
30 3D image data
35 mesh data
40 user input device
42 user input data
60 display
100 system for enabling correction of mesh-based segmentation
120 input interface
122, 124 data communication
140 processor subsystem
142 data communication
160 user interface subsystem
170 user input interface
180 display output interface
182 display data
200 view of image data
210 anatomical structure
220 boundary of anatomical structure
230 applied mesh for segmentation
240 mesh region to be corrected
250 mesh part selected for correction
260 mesh normal direction of selected mesh part
270 neighbouring mesh parts having similar mesh normal direction
280 correction applied to selected and neighbouring mesh parts
290 corrected mesh
300 viewing plane defining view
310 applied mesh for segmentation
320 cross section of mesh in view
330 mesh part intended to be corrected
340 user-selected point indicating correction to be applied
350 mesh part closest to user-selected point in 3D
400 viewing plane defining view
410 applied mesh for segmentation
412 corrected mesh
420 cross section of mesh in view
430 mesh part selected for correction
432 corrected/moved mesh part
500 viewing plane defining view
510 applied mesh for segmentation
520-522 contour points of mesh in view plane
524 contour point of mesh in view plane, selected mesh part
530 mesh normal direction
535 viewing plane normal direction
540 user-selected point 550 mesh part closest to user-selected point in 3D
600 method of enabling correction of mesh-based segmentation
610 accessing 3D image data
620 accessing mesh data
630 displaying view of 3D image data and mesh
640 receiving user input data
650A, 650B selecting mesh parts to be corrected
660A, 660B applying correction to selected mesh parts
700 computer-readable medium
710 non-transitory data

DETAILED DESCRIPTION OF EMBODIMENTS

Figure 1:
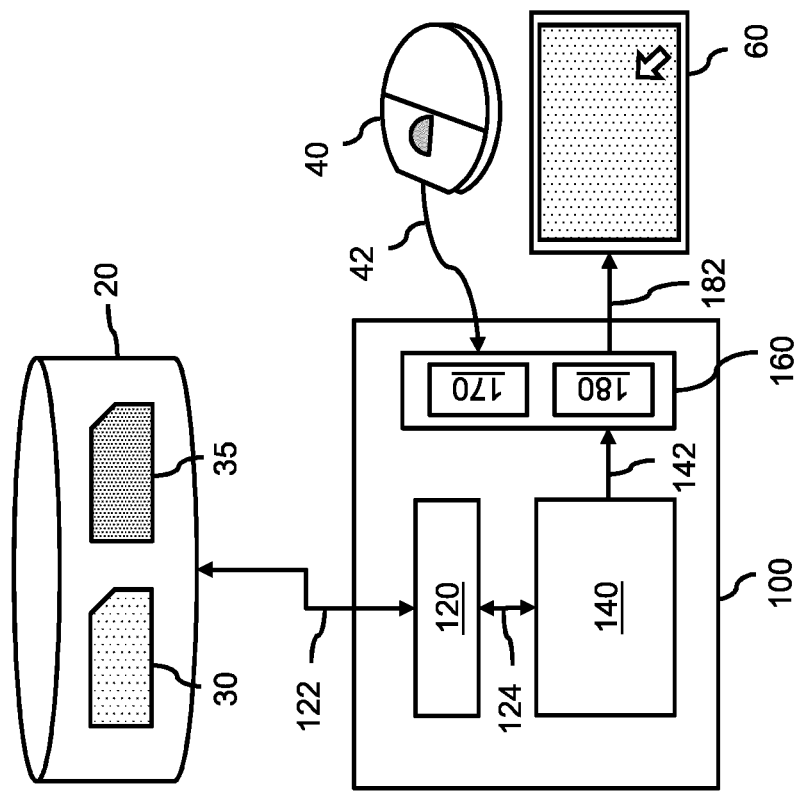
FIG. 1 shows a system for enabling correction of a mesh-based segmentation.

FIG. 1 shows a system 100 for enabling correction of a segmentation of an anatomical structure in 3D image data. The system 100 comprises an input interface 120 configured to access 3D image data 30 of the anatomical structure and mesh data 35 defining a mesh for segmenting the anatomical structure in the 3D image data. In the example of FIG. 1, the input interface 120 is shown to be connected to an external data storage 20 which comprises the 3D image data 30 and the mesh data 35. The data storage 20 may for example be constituted by, or be part of, a Picture Archiving and Communication System (PACS) of a Hospital Information System (HIS) to which the system 100 may be connected or comprised in. Accordingly, the system 100 may obtain access to the image data 30 and the mesh data 35 via external data communication 122. Alternatively, the image data 30 and/or the mesh data 35 may be accessed from an internal data storage of the system 100 (not shown in FIG. 1). In general, the input interface 120 may take various forms, such as a network interface to a Local Area Network (LAN) or a Wide Area Network (WAN), such as the Internet, a storage interface to an internal or external data storage, etc.

Is it noted that the 3D image data 30 and the mesh data 35 may be also accessed from different locations, for example, via different subsystems of the input interface. Each subsystem may be of a type as described above for the input interface.

The system 100 is further shown to comprise a processor subsystem 140 configured to internally communicate with the input interface 120 via data communication 124 and to a user interface subsystem 160 via data communication 142. Furthermore, although not shown in FIG. 1, the system 100 may further comprise a memory, for example for storing a computer program causing the processor subsystem 140 to carry out functions which are described in this specification as being performed by the processor subsystem.

The user interface subsystem 160 may be configured to, during operation of the system 100, enable a user to interact with the system 100, for example using a graphical user interface. In particular, the graphical user interface may enable the user to correct a segmentation of the anatomical structure by the mesh in the 3D image data. For that purpose, the user interface subsystem 160 is shown to comprise a user input interface 170 configured to receive user input data 42 from a user input device 40 operable by the user. The user input device 40 may take various forms, including but not limited to a computer mouse, touch screen, keyboard, microphone, etc. FIG. 1 shows the user input device to be a computer mouse 40. In general, the user input interface 170 may be of a type which corresponds to the type of user input device 40, i.e., it may be a thereto corresponding type of user device interface. The user interface subsystem 160 is further shown to comprise a display output interface 180 configured to provide display data 182 to a display 60 to visualize output of the system 100. In the example of FIG. 1, the display is an external display 60. Alternatively, the display may be an internal display of the system 100.

The processor subsystem 140 may be configured to, during operation of the system 100 and using the user interface subsystem 180, display at least one view showing at least part of the mesh applied to at least part of the 3D image data. For example, the at least one view may be displayed as part of the graphical user interface established by the user interface subsystem 180. The processor subsystem 140 may be further configured to receive user input data indicative of a user-selected point in the view, and based on the user-selected point, select a mesh part to be corrected. The processor subsystem 140 may further be configured to apply a correction to said selected mesh part by moving the selected mesh part with respect to a coordinate system of the 3D image data. Such correction may be configured or controlled by the user, for example in terms of distance, direction, etc.

The processor subsystem 140 may be further configured to further apply the correction to neighbouring mesh parts in a neighbourhood of the selected mesh part by moving the neighbouring mesh parts, and to select the neighbouring mesh parts to be included in the correction based on a similarity between a mesh normal direction of a respective neighbouring mesh part and the mesh normal direction of the selected mesh part.

These and other operations of the system 100, and various optional aspects thereof, will be explained in more detail with reference to FIGS. 2A-5.

In general, the system 100 may be embodied as, or in, a single device or apparatus, such as a workstation or imaging apparatus or mobile device. The device or apparatus may comprise one or more microprocessors which may represent the processor subsystem and which may which execute appropriate software. The software may have been downloaded and/or stored in a corresponding memory, e.g., a volatile memory such as RAM or a non-volatile memory such as Flash. Alternatively, the functional units of the system, e.g., the input interface, the user interface subsystem and the processor subsystem, may be implemented in the device or apparatus in the form of programmable logic, e.g., as a Field-Programmable Gate Array (FPGA). In general, each functional unit of the system 100 may be implemented in the form of a circuit. It is noted that the system 100 may also be implemented in a distributed manner, e.g., involving different devices or apparatuses. For example, the distribution may be in accordance with a client-server model, e.g., using a server and workstation. For example, the user input interface and the display output interface may be part of the workstation, while the processor subsystem may be a subsystem of the server. It is noted that various other distributions are equally conceivable.

The following embodiments described with reference to FIGS. 2A-5 assume that the accessed mesh data already defines a segmentation of the anatomical structure in the 3D image data. For example, another entity may have applied the mesh to the 3D image data, e.g., using known segmentation techniques such as those described by 0. Ecabert et al., and may have generated the mesh data to define the applied mesh, e.g., in terms of coordinates of mesh parts. However, in other embodiments, the system may access mesh data defining a mesh which is not yet applied to the 3D image data, in that the mesh may represent a generic, non-patient specific shape of the anatomical structure to be segmented. The non-patient specific shape of the mesh may elsewhere also be referred to as a 'mean mesh'. The processor subsystem may then apply the mesh to the 3D image data and may update the mesh data to represent the applied mesh or generate new mesh data.

FIG. 2A shows a view 200 showing a part of 3D image data containing an anatomical structure 210. The view may be generated using known view generation techniques, such as multiplanar reformatting, volume projection or simply by selecting a slice from stack of slices representing the 3D image data. The anatomical structure 210 is in this example the heart, of which an outer boundary 220 is to be segmented. In other examples, also other boundaries may be segmented, for example inner boundaries. It is noted that for sake of illustration and legibility, the anatomical structure 210 is shown in FIG. 2A and elsewhere in the form of a 3D mesh model of the heart rather than by actual image data. It will be appreciated, however, that the segmentation is applied to the actual image data.

Figure 2C:
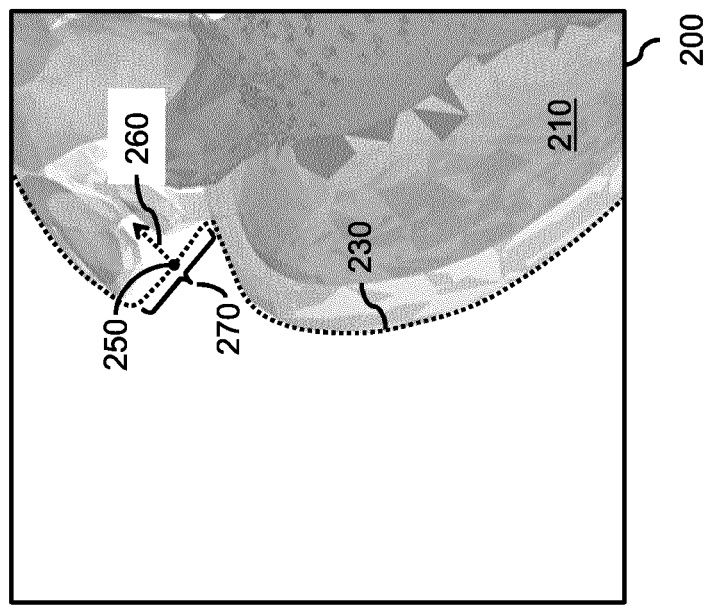
FIG. 2C illustrates i) a mesh part selected for correction, ii) a mesh normal direction of the selected mesh part and iii) a neighbourhood of the selected mesh part.
Figure 2B:
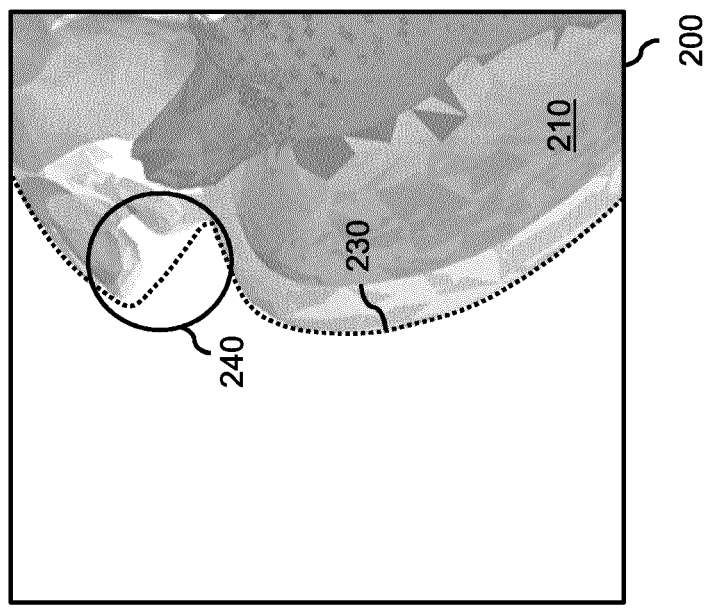
FIG. 2B shows a cross-section of a mesh which is applied to the 3D image data to segment the anatomical structure contained in the 3D image data, with the applied mesh mismatching the boundary of the anatomical structure in a mesh region.

FIG. 2B shows the view 200 further comprising a cross-section of a 3D mesh 230 which is applied to the 3D image data to segment the anatomical structure 210, e.g., the heart, in the 3D image data, and which is shown in FIGS. 2A-2E as a dotted line. In general, the segmentation of an anatomical structure using a mesh may effectively create a patient-specific mesh model of the anatomical structure from the 3D image data. This patient-specific mesh model may be used for measurements (e.g. left ventricular volume over the heart cycle), for diagnosis, treatment planning (e.g. aortic valve implant fitting) or for the prediction of the disease (e.g. biophysical models). As can be seen in FIG. 2B, at least part of the boundary has been incorrectly segmented by the segmentation algorithm, in that the segmentation locally, e.g., in a region 240, mismatches the actual boundary. Such incorrect segmentations may be due to various reasons, e.g., due to limitations in the segmentation method, e.g., because of imperfections in the heuristics, under-training of a trained segmentation, etc. Another reason is that the particular shape of the anatomical structure may not conform to an expected shape which may be modelled by the mesh, e.g., the medical image may be considered 'out-of-spec' for the segmentation method, etc. It will be appreciated that various other types of 'incorrect segmentations' exist as well.

It is in principle known to correct such an incorrect segmentation. However, the inventors have considered that not all views are suitable for correcting the parts of the mesh shown in the respective view. Namely, the view may be defined by a viewing plane (or simply 'view plane') which may intersect the 3D image data or in any other way have a particular orientation with respect to the 3D image data. From a mathematical point of view, if a part of the mesh which is to be corrected has a mesh normal direction which is almost perpendicular to the viewing plane, the view may not be suitable to correct this part of the mesh. Namely, a large angle between mesh normal and viewing plane may lead to an inaccurate correction decision by the user since the viewing plane shows an unsuitable cut through the applied mesh. Rather, it may be preferred that the mesh normal direction lies within the viewing plane or is at least substantially similar to the orientation of the viewing plane. This respect, it is noted that the mesh normal direction may be an inward-pointing normal or an outer-pointing normal and that the term 'direction' refers to a spatial orientation of the mesh normal and does not imply a sign (e.g., inward, outward) of the mesh normal.

At least some of the following measures address the above by taking the mesh normal direction into account in the correction. This may for example involve a user directly or indirectly selecting a mesh part, such as a mesh point, that needs to be corrected. The behaviour of the correction, e.g., in terms of direction, radius/neighbourhood or strength, may then be dependent on the mesh normal direction, and in some embodiments, on a difference between the mesh normal direction and the orientation of the viewing plane.

FIG. 2C illustrates a mesh part 250 having been selected for correction. The mesh part 250 may be directly selected by the user, for example by the user selecting a point in the view 200 which corresponds to the mesh part 250. In other embodiments, the user may select a point in the view 200, based on which the mesh part 250 may be selected by the system, for example as a mesh part which is nearest to the user-selected point. FIG. 2C further illustrates a mesh normal direction 260 of the selected mesh part. In accordance with some embodiments, a correction may be applied to the selected mesh part but also to neighbouring mesh parts. These neighbouring mesh parts may be selected based on the mesh normal direction 260 of the selected mesh part, and in particular, based on a similarity between a mesh normal direction of a respective neighbouring mesh part and the mesh normal direction 260 of the selected mesh part. The similarity in mesh normal directions may for example be determined by determining an angular difference between the mesh normal direction of a respective neighbouring mesh part and the mesh normal direction of the selected mesh part, and selecting the neighbouring mesh part to be included in the correction if the angular difference in mesh normal directions is below a relative or absolute threshold, for example below 20° or 10° or 5°. In FIG. 2C, this may result in neighbouring mesh parts being selected in a neighbourhood 270 in which the mesh parts all have a similar mesh normal direction as the mesh normal direction 260 of the selected mesh part 250. It can be seen that the neighbourhood does not extend past adjacent curvatures of the mesh 230 which are shown in FIG. 2C to now lie at or near the border of neighbourhood 270.

Figure 2E:
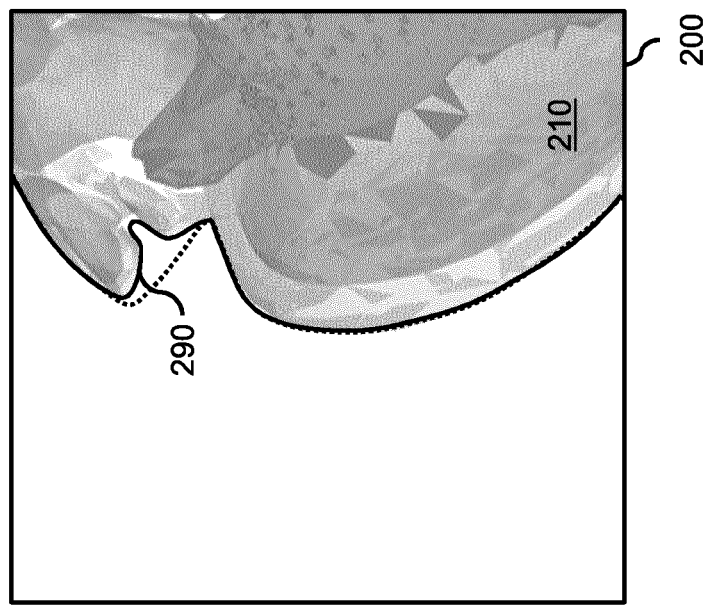
FIG. 2E shows a result of the correction in the form of a corrected mesh.
Figure 2D:
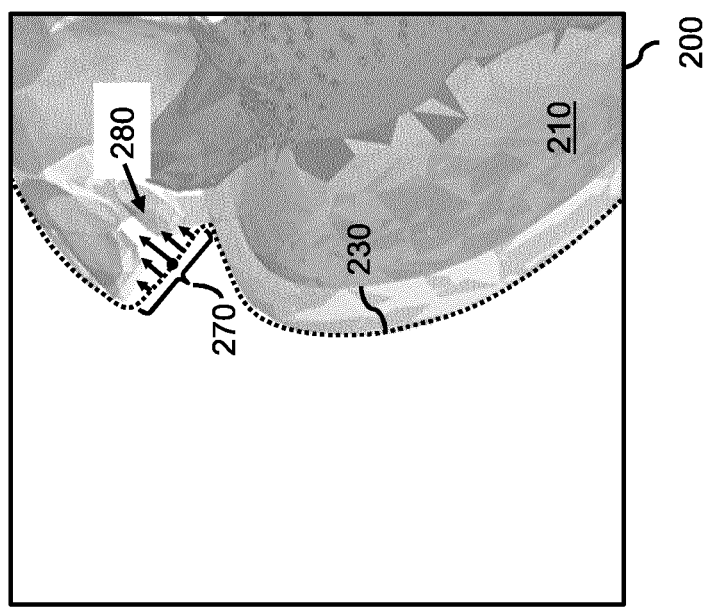
FIG. 2D illustrates a correction of the mesh in the neighbourhood of the selected mesh part by moving neighbouring mesh parts along the mesh normal direction.

FIG. 2D illustrates a correction of the mesh by the selected mesh part and neighbouring mesh parts in the neighbourhood 270 being moved 280 along the mesh normal direction. For example, the user may move the selected mesh part causing the surrounding mesh parts to be moved along with the selected mesh part. Here, the term 'moved along' may refer to the surrounding mesh parts being moved in the mesh normal direction of the selected mesh part, or in the direction of their respective 'own' mesh normal directions. In general, the correction or movement may be configured or controlled by a user, for example in terms of magnitude. The term 'magnitude' may denote a strength of the correction which in turn may define a distance along which the mesh part is to be moved. The distance may be expressed as a displacement vector between the original location of the selected mesh part and the location after the correction. The neighbourhood 270 may thus define a correction region to which the correction is to be applied. As also shown in FIG. 2D, the correction strength of the mesh parts in the correction region may be modulated with respect to the correction strength of the selected mesh part. Here, the term 'modulated' may refer to a (varying) gain factor being applied to the correction strength selected for the selected mesh part. For example, as is also shown in FIG. 2D, the correction strength may be decreased as a function of a distance which a neighbouring mesh part has or originally had with respect to the selected mesh part along the mesh surface. Accordingly, mesh parts near the border of the neighbourhood 270 may be moved less than mesh parts which are located centrally in the neighbourhood 270, e.g., at or near the selected mesh part.

Although not explicitly shown in FIG. 2D, additionally or alternatively, the magnitude of the correction of a neighbouring mesh part may be selected relative to (e.g., may be selected as a function of) the magnitude of the correction of the selected mesh part based on the similarity in mesh normal directions between the neighbouring mesh part and the selected mesh part. Accordingly, neighbouring mesh parts having a more similar mesh normal direction may be moved more and neighbouring mesh parts having a less similar mesh normal direction may be moved less. The modulation based on similarity in mesh normal direction may be combined with other criteria, for example the aforementioned original distance between mesh parts. In general, the correction strength may be expressed as a function which may depend on various parameters, such as the aforementioned similarity mesh normal direction and the aforementioned original distance between mesh parts. In general, the system may limit the magnitude of the correction to be monotonically declining along a line from the selected mesh part to each neighbouring mesh part.

FIG. 2E shows a result of the correction in the form of a corrected mesh 290 which better fits the boundary of the anatomical structure 210 compared to the uncorrected mesh was previously shown, for example in FIG. 2B having reference numeral 230.

In general, the neighbouring mesh parts may be selected as a connected neighbourhood. As such, it may be required for all mesh parts being subjected to the correction to be connected to each other. In general, any correction parameter, such as the neighbourhood or correction radius, the correction strength distribution, etc., may depend on the mesh normal direction of the selected mesh part. The correction radius may determine the size of region around the correction location that is influenced by the correction method. It is known to define the correction radius as a geodesic distance with respect to the selected mesh part, or independence on the correction strength. However, the radius may also be made variable based on the above-mentioned similarity in mesh normal direction. For example, as also previously indicated with reference to FIG. 2C, only mesh parts that have a mesh normal that points in a similar direction (e.g. having a difference below a certain threshold) as the mesh normal of the selected mesh part may be included in the correction region. Such a correction region may represent the neighbourhood 270 as previously described with reference to FIGS. 2C and 2D. The transition between correction region and an outer region, e.g., outside of the correction region, may be smoothed instead of stepwise. For example, a correction weight between zero and one may be selected for each mesh part in the correction region which may vary from zero, e.g., no correction, to 1, e.g., the same correction strength as for the selected mesh part. The correction weight may gradually reduce to 0 towards the outer region instead of reducing from 1 inside of the correction region to 0 outside of the correction region in a stepwise fashion. The reduction in correction weight from 1 to 0, or in general any type of change, may also be anisotropic, e.g., reducing faster or more gradual in one particular direction than in another direction.

As also described previously, the correction strength may also be influenced by the local mesh normal direction. For example, the correction weight may be selected based on a deviation between the mesh normal direction of the select mesh part and the mesh normal direction of a surrounding mesh part, which may typically also result in a smooth transition between the correction region and the outer region. Additional restriction which may be imposed to the selection of the correction weight may be the following: points cannot have a weight larger than the minimal weight between their location and the starting point. This may ensure that once the correction weight is reduced, it cannot be increased again for mesh parts further away. This may ensure a more compact correction region.

Some of the following embodiments may use the angle or angular difference between the mesh normal direction of the selected mesh part and the viewing plane. The angle or angular difference may be used in a so-called angular suitability criterion which may require that a difference of the mesh normal direction 530 of a respective mesh part with respect to the viewing plane is below a threshold or is minimal amongst a set of mesh parts in a neighbourhood of the user-selected point. The angular difference or the angular suitability may be pre-encoded, e.g., in the mesh, or may be calculated in real-time. Pre-encoding is possible if it is known how the viewing plane and the mesh are oriented relative to each other e.g., due to a specific protocol. For example, if the acquisition protocol is a short axis acquisition, the image slices may be acquired along the axis from mitral valve to apex. Therefore, the orthogonal view directions in relation to the mesh are known. For each mesh triangle of the non-applied, non-patient specific mesh model (mean mesh), the triangle normal may be calculated. It is noted that the orientation of the applied mesh may vary slightly from the orientation of the mean mesh, which may cause slight inaccuracies. To avoid such inaccuracies, the mesh normal direction may be calculated in real-time for all mesh triangles (of the current segmented and corrected mesh) in the view plane.

Figure 3:
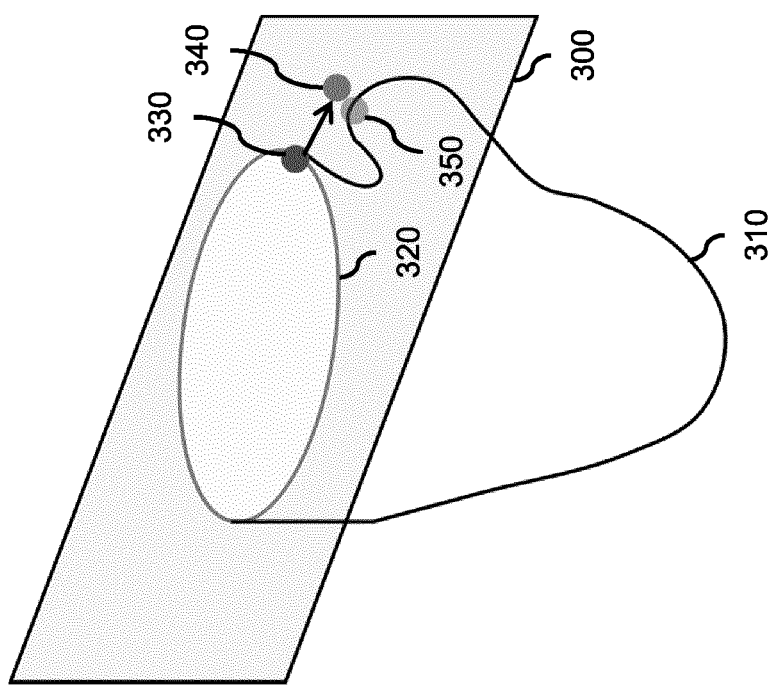
FIG. 3 illustrates a modified version of a so-called 'one click correction mechanism' in which a user selects a point in the view and in which, instead of moving a mesh part which is nearest in 3D to the user-selected point, a mesh part is selected and moved which has a mesh normal direction deemed to be suitable for this correction.

FIG. 3 illustrates a modified version of the so-called one-click correction mechanism in which a user may select a point in the view 340 to indicate an intended correction, in that the user may wish the mesh 310 to be locally moved to or towards this user-selected point 340. It is known to select a nearest mesh part in 3D, which may in FIG. 3B be mesh part 350, and to move this selected mesh part 350 to the user selected point 340 and to move mesh parts within a pre-defined neighbourhood of the selected mesh part 350 along with the selected mesh part 350. However, as also illustrated in FIG. 3, the user may only see a cross-section 320 of the mesh 310 in the current viewing plane, and the nearest mesh part in 3D may be a mesh part which is not in-plane, i.e., which does not lie in the current viewing plane, and which may therefore currently not be visible to the user. This may lead to corrections which may not be expected by the user. To avoid such problems, the relative orientation of the mesh and the viewing plane 300 may be taken into account, in that not the nearest mesh point in 3D selected, but a nearest mesh point which in addition has a mesh normal which lies in-plane or nearly in-plane. For example, a mesh part may be selected which has a mesh normal direction which lies within 20° of the viewing plane 300. Of all suitable mesh parts which satisfied this mesh normal direction criterion, which is elsewhere also referred to as an 'angular suitability criterion' the mesh part may then be selected which is nearest to the user-selected point 340, which may in FIG. 3 the mesh part 330 and which may not have to lie in the viewing plane 300 either. Accordingly, the mesh part 330 may be moved to the user-selected point 340 instead of the mesh part 350. The above may represent a modified 'one-click correction mechanism' which may also be implemented separately from other measures described in this specification.

Figure 4A:
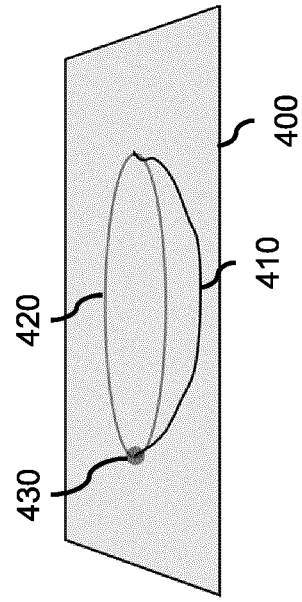
FIGS. 4A and 4B illustrate a selection by user of a mesh part to be corrected, in which the mesh part has a mesh normal direction which is not in-plane with the viewing plane and in which the mesh part is allowed to be moved orthogonally to the viewing plane.
Figure 4B:
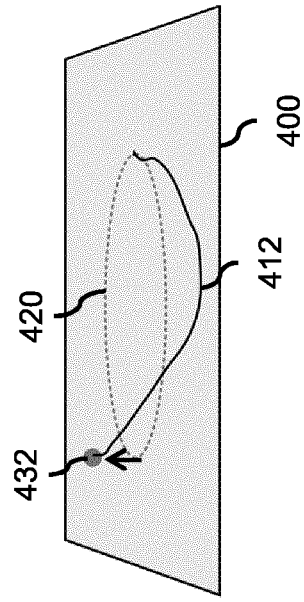

FIGS. 4A and 4B illustrate a modified user interaction in which an additional user interaction is provided in case a selected mesh part 430 has a mesh normal direction which is clearly not in-plane with the viewing plane 400. Such a modified user interaction may be provided in various correction mechanisms, for example in the so-called 'variable radius correction' in which a user may select a point in the view, e.g., by clicking in the view, which may result in the nearest in-plane mesh part being selected, which may in the example of FIG. 4A be the mesh part 430. The selected mesh part 430 may then be moved within the viewing plane 400, for example by dragging via a mouse cursor, and a predefined mesh neighbourhood may be moved along with the selected mesh part 430. However, when the angular difference between the mesh normal direction of the selected mesh part and the viewing plane 400 is very large (e.g., 60° to 90°, e.g., the mesh normal is clearly not in-plane), it might be desirable to allow also an up- and down-movement of the mesh part 430 orthogonal to the viewing plane 400 or in the direction of the mesh normal. For example, an additional mouse or keyboard interaction may be activated that allows such a movement. For example, a mouse wheel or the up- and down-arrow keys may move the selected mesh part 430 up or down. Accordingly, depending on the mesh normal of the selected mesh part, the user interaction with the correction method may be changed. If the mesh normal is insufficiently in the viewing plane, an additional user interaction with the mesh correction may be allowed. For example, instead of horizontal dragging within the viewing plane, also a vertical dragging may be allowed. Such type of user interaction may be enabled by adding a new functionality to for example the mouse wheel as long as mesh parts with an unsuitable mesh normal are edited. Afterwards, this new user interaction may be turned off again.

FIG. 4B shows a result of such a correction, in which the selected mesh part 430 may be moved orthogonally to the viewing plane 400 to obtain a moved and thereby 'corrected' mesh part 432 and accordingly a corrected mesh 412. For reference, FIG. 4A also shows the 'uncorrected' mesh 410 and its cross-section 420 with the viewing plane 400.

Figure 5:
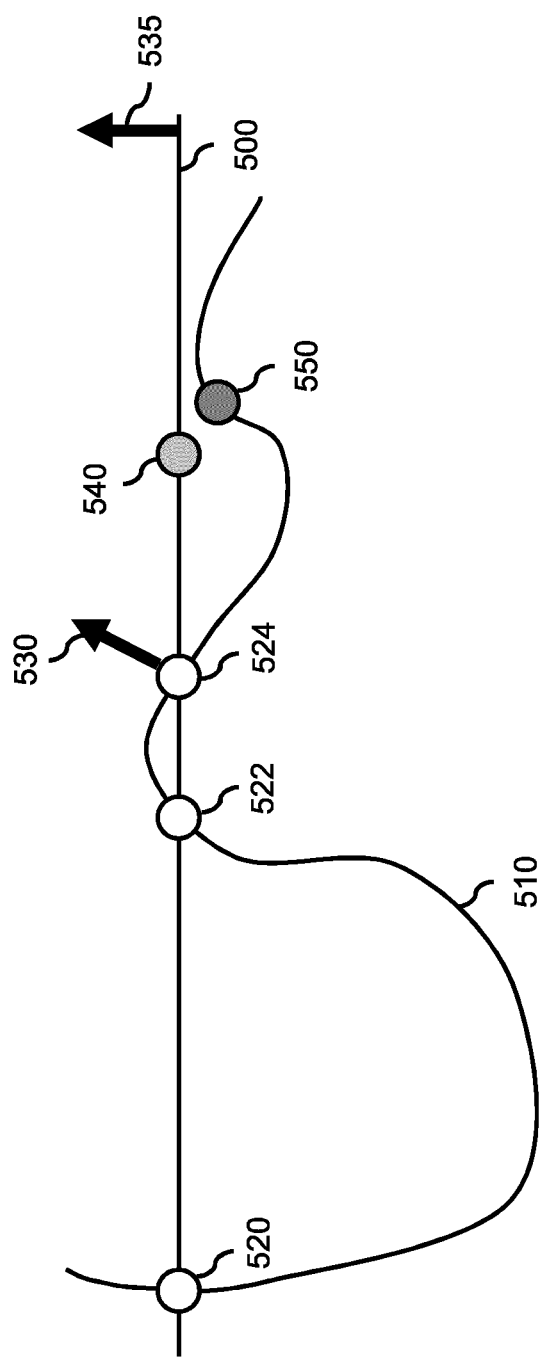
FIG. 5 illustrates a correction of a selected mesh part by enabling the user to move the mesh part along the mesh normal direction of the mesh part.

FIG. 5 illustrates a correction of a selected mesh part by enabling the user to move the mesh part along the mesh normal direction of the mesh part. In general, there may be two extreme cases of the direction in which a selected mesh part may be moved, namely at the 0° and 90° angles with respect to the viewing plane, whereby the latter case may be more favourably if a large angle exists between the viewing plane and the mesh normal direction of the selected mesh part. In general, the correction direction may depend on the mesh normal of the selected mesh part. For example, the correction direction may be adjusted from in-plane towards the mesh normal, or may be identical to the mesh normal.

An example is depicted in FIG. 5, showing a mesh 510, a viewing plane 500 intersecting the mesh 510 at various mesh parts 520-524 and a normal direction 535 of the viewing plane. The intersected mesh parts 520-524 may also be referred to as 'contour points'. A user may select a point 540 in the view. When using a radius correction mechanism, a closest mesh part may be selected which lies in-plane, being here contour point 524, instead of selecting the mesh part 550 that is closest in 3D to the user-selected point 540. The selected mesh part 524 may typically be moved in-plane by the user when using a radius correction mechanism. However, in a modification of the radius correction mechanism, the selected mesh part 524 may be moved along the mesh normal 530 of the selected mesh part 524. This may provide a similar result as in the FIG. 3 embodiment, since the cross-section of the mesh 510 with the viewing plane 500 may be moved closer to the user-selected point 540. Nevertheless, compared to the FIG. 3 embodiment, the user may move a mesh part which originally lies in-plane, which may be more intuitive for the user. It is noted that in the example of FIG. 5, the correction region may start at the peak between the contour point 524 and the contour point 522 and end between the contour point 524 and the mesh point 550. This part of the mesh 510 may effectively be 'lifted' in the direction of the mesh normal at the contour point 524, resulting in the mesh part 550 nearing the user-selected point 540. However, the contour point 520 may remain unaffected by the correction.

Figure 6:
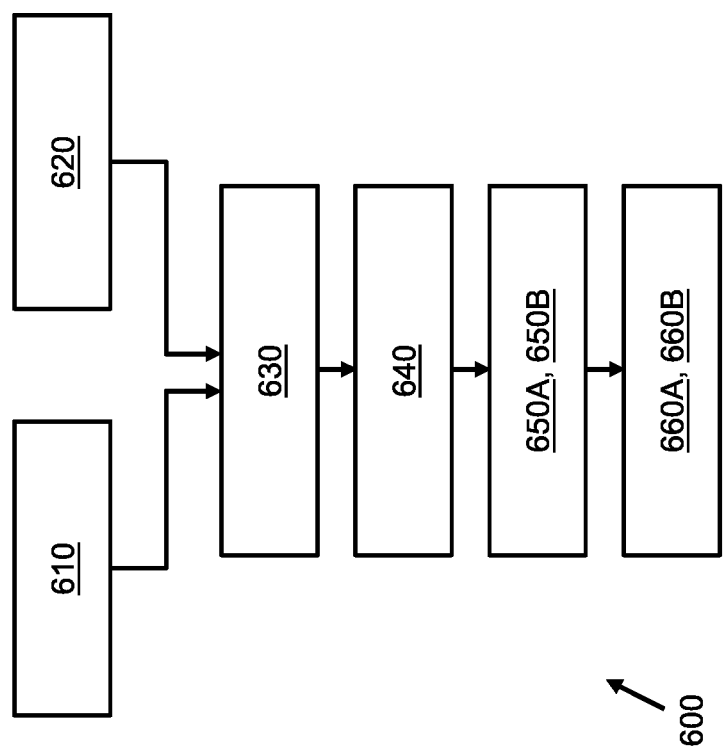
FIG. 6 shows a computer-implemented method for enabling a correction of mesh-based segmentation.

FIG. 6 shows a block-diagram of computer-implemented method 600 for enabling correction of mesh-based segmentation. The method 600 may correspond to an operation of the system 100 of FIG. 1. However, this is not a limitation, in that the method 600 may also be performed using another system, apparatus or device.

The method 600 is shown to comprise, in an operation titled "ACCESSING 3D IMAGE DATA", accessing 610 the 3D image data of the anatomical structure. The method 600 is further shown to comprise, in an operation titled "ACCESSING MESH DATA", accessing 620 mesh data defining the mesh. The method 600 is further shown to comprise, in an operation titled "DISPLAYING VIEW OF 3D IMAGE DATA AND MESH", displaying 630 at least one view showing at least part of the mesh applied to at least part of the 3D image data, and in an operation titled "RECEIVING USER INPUT DATA", receiving 640 user input data indicative of a user-selected point in the view. The method 600 is further shown to comprise, in an operation titled "SELECTING MESH PARTS TO BE CORRECTED", based on the user-selected point, selecting 650A a mesh part to be corrected, and in an operation titled "APPLYING CORRECTION TO SELECTED MESH PARTS", applying 660A a correction to said selected mesh part by moving the selected mesh part with respect to a coordinate system of the 3D image data. The method 600 is further shown to comprise, in the operation titled "APPLYING CORRECTION TO SELECTED MESH PARTS", further applying 660B the correction to neighbouring mesh parts in a neighbourhood of the selected mesh part by moving the neighbouring mesh parts, and in the operation titled "SELECTING MESH PARTS TO BE CORRECTED", selecting 650B the neighbouring mesh parts to be included in the correction based on a similarity between a mesh normal direction of a respective neighbouring mesh part and the mesh normal direction of the selected mesh part.

It will be appreciated that in general, operations of method 600 of FIG. 6 may be performed in any suitable order, e.g., consecutively, simultaneously, or a combination thereof, subject to, where applicable, a particular order being necessitated, e.g., by input/output relations. Operations may also be performed as part of other operations.

Figure 7:
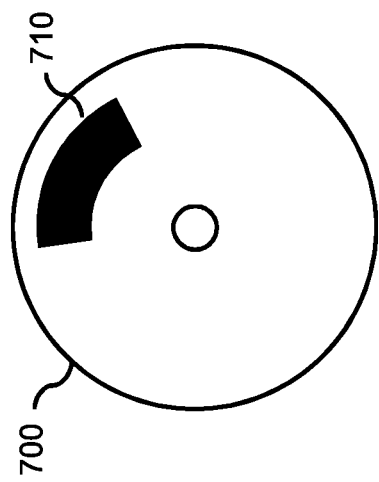
FIG. 7 shows a computer-readable medium comprising data.

The method may be implemented on a computer as a computer implemented method, as dedicated hardware, or as a combination of both. As also illustrated in FIG. 7, instructions for the computer, e.g., executable code, may be stored on a computer readable medium 700, e.g., in the form of a series 710 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 7 shows an optical disc 700.

Examples, embodiments or optional features, whether indicated as non-limiting or not, are not to be understood as limiting the invention as claimed.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A system for enabling correction of a segmentation of an anatomical structure in 3D image data, wherein the segmentation is provided by a mesh which is applied to the 3D image data to segment the anatomical structure, the system comprising:
    an input interface for accessing the 3D image data of the anatomical structure and mesh data defining the mesh;
    a user interface subsystem comprising:
        a user input interface configured to receive user input data from a user input device operable by a user;
        a display output interface configured to provide display data to a display to visualize output of the system;
    a processor subsystem configured to, using the user interface subsystem, establish a graphical user interface which enables the user to correct the segmentation of the anatomical structure by the mesh in the 3D image data, wherein the processor subsystem is configured to, using the user interface subsystem:
        display at least one view showing at least part of the mesh applied to at least part of the 3D image data;
        receive user input data indicative of a user-selected point in the view;
        based on the user-selected point, select a mesh part to be corrected;
        apply a correction to said selected mesh part by moving the selected mesh part with respect to a coordinate system of the 3D image data;
        further apply the correction to neighbouring mesh parts in a neighbourhood of the selected mesh part by moving the neighbouring mesh parts; and
        select the neighbouring mesh parts to be included in the correction based on a similarity between a mesh normal direction of a respective neighbouring mesh part and a mesh normal direction of the selected mesh part and further based on the difference in the mesh normal directions being below a threshold, wherein the threshold is 20 degrees or less.

2. The system according to claim 1, wherein the processor subsystem is configured to select the neighbouring mesh parts as a connected neighbourhood.

3. The system according to claim 1, wherein the processor subsystem is configured to select a magnitude of the correction of the neighbouring mesh part relative to a magnitude of the correction of the selected mesh part based on the similarity in mesh normal directions between the neighbouring mesh part and the selected mesh part.

4. The system according to claim 3, wherein the processor subsystem is configured to limit the magnitude of the correction to be monotonically declining along a line from the selected mesh part to each neighbouring mesh part.

5. The system according to claim 1, wherein the view is defined by a viewing plane having an orientation in the coordinate system of the 3D image data, and wherein the processor subsystem is configured to select the mesh part based on the user-selected point based on the mesh part satisfying an angular suitability criterion, wherein the angular suitability criterion defines that a difference of the mesh normal direction of the selected mesh part with respect to the viewing plane is below a threshold or is minimal amongst a set of mesh parts in a neighbourhood of the user-selected point.

6. The system according to claim 5, wherein the processor subsystem is configured to select the mesh part to be corrected as the mesh part which is:
    nearest to the user-selected point, and
    satisfies the angular suitability criterion.

7. The system according to claim 6, wherein the processor subsystem is configured to select the mesh part to be corrected as the mesh part which is:
    nearest to the user-selected point in the 3D coordinate system; or
    nearest to the user-selected point in the viewing plane.

8. The system according to claim 1, wherein the correction moves the selected mesh part along a line, and wherein the processor subsystem is configured to determine a direction of the line based on the mesh normal direction of the selected mesh part.

9. The system according to claim 8, wherein the processor subsystem is configured to determine the direction of the line to be substantially equal to the mesh normal direction of the selected mesh part or to have a difference with the mesh normal direction of the selected mesh part which is below a threshold.

10. The system according to claim 5, wherein the orientation of the viewing plane is preconfigured, and wherein the angular suitability criterion is precalculated for all or a subset of the mesh parts of the mesh before the selection of the user-selected point.

11. The system according to claim 5, wherein the processor subsystem is configured to visualize, in the view, said satisfying of the angular suitability criterion by a respective mesh part and/or the difference of the mesh normal direction of the respective mesh part with the viewing plane.

12. The system according to claim 11, wherein the processor subsystem is configured to visualize the satisfying of the angular suitability criterion and/or the difference of the mesh normal direction of the respective mesh part with the viewing plane by color-coding of respective mesh parts in the view.

13. A computer-implemented method for enabling correction of a segmentation of an anatomical structure in 3D image data, wherein the segmentation is provided by a mesh which is applied to the 3D image data to segment the anatomical structure, the method comprising:

accessing the 3D image data of the anatomical structure;
accessing mesh data defining the mesh;
displaying at least one view showing at least part of the mesh applied to at least part of the 3D image data;
receiving user input data indicative of a user-selected point in the view;
based on the user-selected point, selecting a mesh part to be corrected;
applying a correction to said selected mesh part by moving the selected mesh part with respect to a coordinate system of the 3D image data;
further applying the correction to neighbouring mesh parts in a neighbourhood of the selected mesh part by moving the neighbouring mesh parts; and
selecting the neighbouring mesh parts to be included in the correction based on a similarity between a mesh normal direction of a respective neighbouring mesh part and a mesh normal direction of the selected mesh part and further based on the difference in the mesh normal directions being below a threshold, wherein the threshold is 20 degrees or less.

14. A non-transitory computer-readable medium storing instructions that, when executed by one or more processors, cause the one or more processors to perform the method of claim 13.

15. A computer-implemented method for enabling correction of a segmentation of an anatomical structure in three-dimensional (3D) image data, wherein the segmentation is provided by a mesh which is applied to the 3D image data to segment the anatomical structure, the method comprising:
accessing the 3D image data of the anatomical structure;
accessing mesh data defining the mesh;
displaying at least one view showing at least part of the mesh applied to at least part of the 3D image data;
receiving user input data indicative of a user-selected point in the view;
based on the user-selected point, selecting a mesh part to be corrected;
applying a correction to said selected mesh part by moving the selected mesh part with respect to a coordinate system of the 3D image data;
further applying the correction to neighbouring mesh parts in a neighbourhood of the selected mesh part by moving the neighbouring mesh parts; and
selecting the neighbouring mesh parts to be included in the correction as a connected neighbourhood based on a similarity between a mesh normal direction of a respective neighbouring mesh part and the mesh normal direction of the selected mesh part.

16. A non-transitory computer-readable medium storing instructions that, when executed by one or more processors, cause the one or more processors to perform the method of claim 15.

* * * * *